United States Patent [19]

Klimmer et al.

[11] Patent Number: 4,968,284
[45] Date of Patent: Nov. 6, 1990

[54] CONVEYOR ARRANGEMENT FOR A HARVESTING MACHINE

[75] Inventors: Josef W. Klimmer; Paul Hagerer, both of Zweibrucken, Fed. Rep. of Germany

[73] Assignee: Deere & Company, Moline, Ill.

[21] Appl. No.: 381,435

[22] Filed: Jul. 18, 1989

[51] Int. Cl.⁵ .............................................. A01F 12/46
[52] U.S. Cl. ........................................ 460/8; 460/114; 460/901; 56/DIG. 10
[58] Field of Search ................ 460/8, 9, 20, 79, 84, 460/95, 114, 150, 901, 903; 56/4, 219, 220, 466, DIG. 5, DIG. 10, 2, 3

[56] References Cited

U.S. PATENT DOCUMENTS

| | | |
|---|---|---|
| 2,542,346 | 2/1951 | Mormann . |
| 4,344,443 | 8/1982 | DeBusscher et al. ............... 460/150 |
| 4,677,991 | 7/1987 | Harris et al. ............... 460/8 |

FOREIGN PATENT DOCUMENTS

| | | |
|---|---|---|
| 87488 | 9/1983 | European Pat. Off. . |
| 178018 | 4/1986 | European Pat. Off. . |
| 310938 | 4/1989 | European Pat. Off. . |
| 312655 | 4/1989 | European Pat. Off. . |
| 2161137 | 6/1973 | France . |
| 2236407 | 7/1973 | France . |

*Primary Examiner*—Ramon S. Britts
*Assistant Examiner*—Terry Lee Melius

[57] ABSTRACT

An agricultural harvesting machine having a feeder assembly, a conveyor arrangement and an output unit. In a combine, the feeder arrangement comprises a threshing cylinder and concave that direct threshed crop material to the conveyor arrangement. The conveyor arrangement directs crop material to the output unit which comprises a cleaning shoe. The conveyor arrangement comprises a conveyor chute having fixed converging guide vanes. The conveyor chute can be rotated about a bearing for directing crop material to the uphill side of the combine.

14 Claims, 2 Drawing Sheets

CONVEYOR ARRANGEMENT FOR A HARVESTING MACHINE

BACKGROUND OF THE INVENTION

1. Field of the Invention

The invention is directed to a conveyor arrangement for a harvesting machine, in particular, a combine, having a feeder assembly, a conveyor chute and an output unit. The conveyor chute is equipped with guide vanes which guide a flow of crop material along the conveyor chute.

2. Description of the Prior Art

In a conveyor arrangement of this type located in a combine (DE-GM 88 00 121), the conveyor chute is equipped with two sets of guide vanes. One set of guide vanes is fixed with respect to the conveyor chute and the other set is moveable. All guide vanes of one set are oriented parallel to each other. The moveable guide vanes are swung by means of a control arrangement, where a relationship exists between the sideways inclination of the combine and the position of the moveable sections. During operation on an incline, the deflection of these guide vanes should convey the threshed crop material from the downslope side to the upslope side on its path across the conveyor chute.

Conveyor arrangements that operate on such a principle need the crop material to flow easily and be relatively clean. Otherwise, a pile-up can develop at the transition from the moveable to the fixed guide vanes.

SUMMARY

It is an object of the present invention to provide a conveyor arrangement by which contaminated and non-homogeneous crop material can be conveyed without crop pile-up despite sideways inclination of the conveyor chute and without it accumulating at the downslope side of the output unit during the transfer to the output unit.

With this invention, the crop is guided from the downslope side in the area of the feeder assembly to the upslope side in the area of the output unit. On a combine, the feeder assembly comprises a threshing cylinder and concave. The crop flow itself is not diverted to a noticeable degree, as is the case with the moveable guide vanes. Therefore, pile-up is eliminated. Moreover, the sideways movement of the crop is accomplished over a longer distance at a lower angle of deflection. Only a single part, the conveyor chute, is moved in the plane of the conveyor. This does not rule out the possibility of equipping the moveable conveyor chute with moveable guide vanes. In view of the disadvantages described above, such moveable guide vanes should be moved only a small amount. The movement of the conveyor chute can be accomplished by a mechanical linkage or by a push-pull control cable.

Although the conveyor chute could be supported on a bearing near the midpoint of its length, the effect is greatest when the pivoting axis is located as far as possible towards the front of the conveyor chute.

If the largest area between the feeder assembly and the output unit is to be available for purposes of conveying, then the conveyor chute should be configured as a cone or a trapezoid in the plane of the conveyor, where the wide end is located at the front adjacent to the feeder assembly and the narrow end at the rear adjacent to the output unit.

To avoid pile-up of crop due to narrowing of conveyor spaces between guide vanes, all guide vanes are arranged in a uniformly converging pattern in the direction of conveying.

If harvesting machines are manufactured on a production line basis and intended for only occasional operation on inclines, the present invention can be formed by installing the conveyor chute in a conveyor pan or a conveyor frame. The conveyor pan or frame may be equipped with either a moveable or a fixed conveyor chute. The driving components would then engage the conveyor chute only indirectly.

To avoid time-consuming adjustment procedures that cannot cope with rapidly changing harvesting conditions, an automatic control arrangement can be provided, which receives input signals from sensors and which transmits output signals to one or more motors for the movement of the conveyor chute. In the preferred embodiment, electric motors are used; however, hydraulic or pneumatic motors are also suitable in this application. The sensors may be pure inclination sensors; alternately, the sensors could detect crop losses due to the uneven distribution of the flow of the crop. A detailed description of an appropriate control arrangement is found in U.S. patent application Ser. No. 253,834, filed Oct. 5, 1988, which is assigned to the assignee of the present invention. This patent application discloses a control arrangement for positioning moveable guide vanes in response to the slope operating conditions. A similar positioning motor may be used to position the conveyor chute of the present invention. With this system, a push-pull cable is used to position the conveyor chute, therefore, the positioning motor is not exposed to the oscillating movement of the conveyor chute. It is only necessary that the push-pull cable be sufficiently flexible to overcome the oscillating movement.

When the control arrangement is equipped with a microcomputer, the varying harvesting conditions can be considered and the conveyor chute moved to various positions for the otherwise equal harvesting conditions. For example, for a coarse, light crop, the movement may differ from that for a fine-grained, heavy crop. A delay circuit may be switched selectively to assure that a control operation is not performed for every unevenness of the ground. In addition, it is possible to program the swing movement at the end of a field during the turning of the harvesting machine, since it inclines in a different direction while an uneven distribution on the conveyor chute persists for a time from the preceding inclination.

To avoid losses of crop between the conveyor chute and the housing that surround its, and in particular, to avoid crop from infiltrating the area between the conveyor chute and the conveyor pan, a flexible seal is provided in the preferred embodiment at the outer guide vanes.

DETAILED DESCRIPTION

Figure 1:
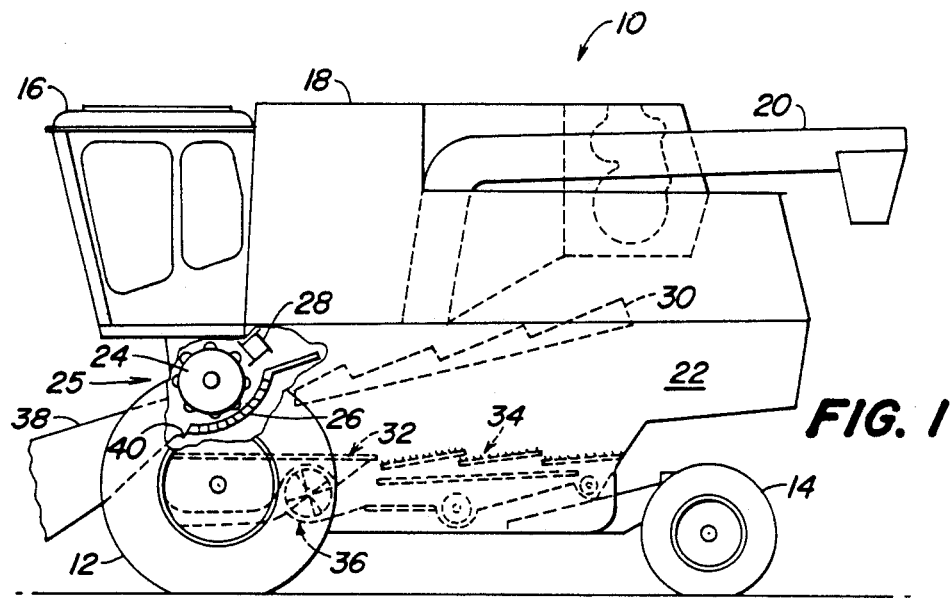
FIG. 1 is a simplified side view of a combine.

A harvesting machine 10 such as a combine, is supported upon the ground by front and rear wheels 12, 14, and hence follows the contours of the ground and its inclination. The operation of the harvesting machine 10 is performed by an operator from an operator's cab 16 and consists principally of optimizing crop intake, monitoring possible speeds and acceptable losses. A grain tank 18 is located behind the operator's cab 16 for holding the processed crop material. The processed crop may be transferred to a trailer through an unloading auger 20. In addition, the harvesting machine 10 contains a housing 22 which accommodates a feeder assembly 25, consisting of a threshing cylinder 24, a concave 26 and a beater 28. Housing 22 also houses several straw walkers 30, a conveyor arrangement 32, an output unit 34 and a blower 36. The crop is harvested by a harvesting platform or a picker and is transmitted to the housing 22 by a feeder house 38 and is processed by the above-named components.

The feeder assembly 25 extends across the width of the housing 22 and during the operation on generally horizontal ground, is normally supplied across its entire width with crop to be threshed. The concave 26 is provided, in known manner, with holes through which the threshed crop is delivered to the front portion of the conveyor arrangement 32. Crop that is separated by the straw walker 30 is also thrown from the left end of the straw walker 30, as shown in FIG. 1, upon the front, or at least the central portion of the conveyor arrangement 32. As is usual in current conveyor arrangements, the conveyor arrangement 32 transports the threshed crop, which still contains impurities such as straw, parts of hulls, etc., from left to right in FIG. 1. Therefore, the threshed and separated crop is directed to the output unit 34, by the conveyor arrangement 32. In a combine, the output unit is the cleaning shoe which is composed of sieves and separates the useable crop from the impurities. An air flow is generated by the blower 36 and is forced through the cleaning shoe for the cleaning process. The cleaning process generally ejects lighter, nonuseable components of the crop at the rear end of the harvesting machine 10, located at the right in FIG. 1.

The cleaning capacity and operation of the cleaning shoe is very dependent upon the uniformity of material distribution on the cleaning shoe. The cleaning shoe is normally supplied with a uniform distribution of crop material when the combine is operated on a generally horizontal terrain. A shift of the crop material toward the downslope side occurs when operating the combine on an incline. This uneven distribution of the crop material during operation on an incline results in the air flow generated by the blower 36 seeking the path of least resistance and flowing through the output unit 34 in the area where little or no crop has been deposited. Therefore, crop material is transported across the output unit 34 without being cleaned. As this results in too large a volume of crop material, it cannot be transported by the output unit 34 to the collection container 18. On the contrary, a part of the crop flow will leave the output unit 34 at the end of the housing 22 and drop to the ground where it will be lost. The amount of lost crop can be detected by grain loss sensors, not shown, and transmitted to a control arrangement also not shown.

Figure 2:
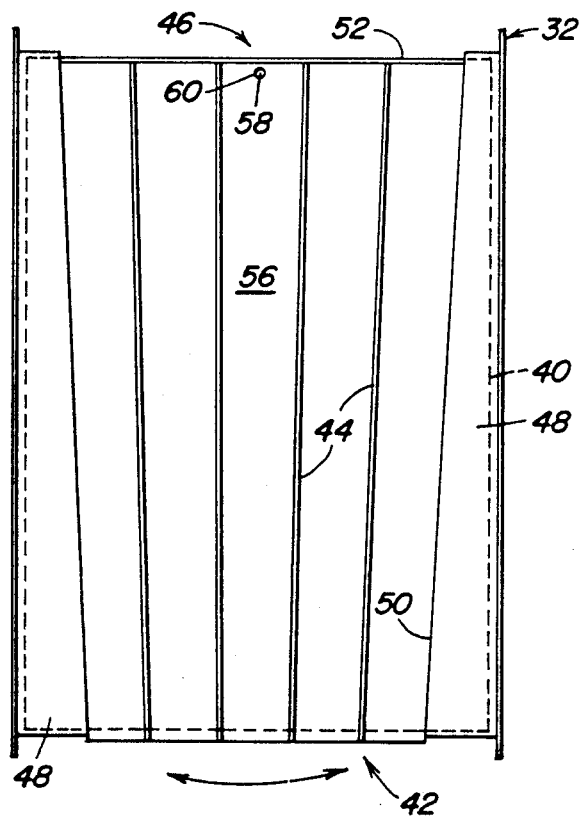
FIG. 2 is a plan view of a conveyor arrangement according to the invention.
Figure 3:
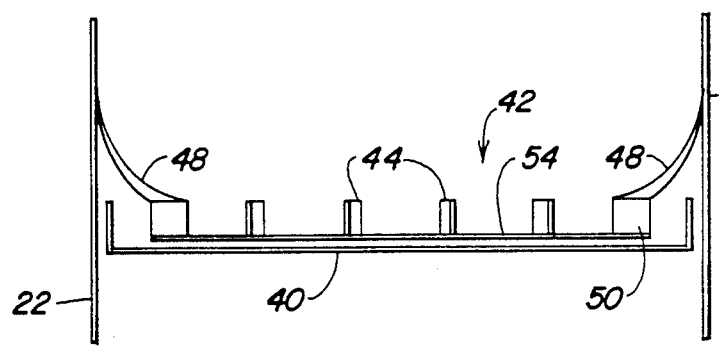
FIG. 3 is a front view of the conveyor arrangement of FIG. 2.

To avoid the aforementioned crop losses, the conveyor arrangement is configured according to FIGS. 2 and 3.

The conveyor arrangement 32, according to the invention, comprises a conveyor pan 40, a conveyor chute 42 with guide vanes 44, a bearing 46 and seals 48.

The conveyor pan 40 is suspended within the housing 22 by conventional means, hence not shown. The conveyor pan is oscillated in the manner of a vibrating conveyor, so that a crop flow from the feeder assembly 25 is moved to the right in FIG. 1 and is loosened up by this means. In a conventional combine, conveyor pan 40 would be equipped with a ribbed bottom sheet and guide vanes 44.

In this conveyor arrangement 32, in the forward area near the feeder assembly 25, a bearing journal 58 of the bearing 46 is attached near its midpoint to the conveyor pan 40, for example, by bolting or welding. The bearing axis about which the conveyor chute can swing is oriented perpendicular to the conveyor plane and hence to the bottom sheet of the conveyor pan 40. The conveyor pan 40 extends across the width inside the housing 22, where obviously a small clearance is maintained between the two parts.

Instead of the conveyor pan 40, a conveyor frame could be provided in which the conveyor chute 42 is supported or suspended. In such a conveyor frame, the conveyor chute 42 could be replaced by a fixed conveyor chute.

The conveyor pan 40 has the advantage over the conveyor frame when the moveable conveyor chute 42 is not to be used, ribbed plates and fixed guide vanes are easily installed on the bottom sheet of the conveyor pan 40.

The conveyor chute 42 is also configured as a pan and is trapezoidal in shape, where the narrow end is located near the output unit 34 and the wide end near the feeder assembly 25. For the manufacture of the conveyor chute 42, a trapezoidal piece of sheet metal is used, with the sides and the forward end bent upward to form side walls 50 and the end wall 52 which are welded at the corners to form a stable reinforcement for the bottom plate 54. Following this, ribbed bottom plates, not shown, and the guide vanes 44 are attached to the bottom plate 54 by spotwelding, riveting or bolting. The conveying spaces 56 between the guide vanes 44, or between the guide vanes 44 and the sidewall 50, show equal widths at each end so that over the entire length of the conveyor chute 42 a uniform, but gradual reduction in width occurs in the direction of conveying which does not impede the flow of the crop or does so only negligibly. In the forward end region, an opening 60 is provided near the center of the conveyor chute 42 in which the bearing journal 58 is free to pivot. The conveyor chute 42 can pivot about the bearing journal 58 in the plane of FIG. 2, swinging to the point at which the side walls 50 make contact with the conveyor pan 40 in their end positions. It can be seen that the side taper of the conveyor chute 42 will determine amount of swing.

FIG. 3 shows in particular how the conveyor chute 42 is supported in the conveyor pan 40 and that the seals 48 ex&:end from the side walls 50 to the inner surface of the housing 22. The seals 48 are sufficiently flexible to accommodate all positions of the conveyor chute 42, to assure that no crop enters the space between the conveyor chute 42 and the conveyor pan 40. Depending on the material of the seals 48, the side walls 50 may be flanged and the seals 48 attached to the flange. In this case, the conveyor chute 42 may be bent from a rectangular piece of sheet metal.

Positioning of the conveyor chute 42 with respect to the conveyor pan 40 is accomplished by a control arrangement, not shown, with one or more motors, in particular, electric motors located below the conveyor pan 40. For this purpose, an opening, not shown, is provided in the conveyor pan 40 near the output end through which the motor or motors engage the conveyor chute 42 in order to swing it. If a conveyor frame is used in place of the conveyor pan 40, the opening may be omitted.

A detailed description of a control arrangement for positioning moveable guide vanes is disclosed in U.S. patent application, Ser. No. 253,834, filed Oct. 5 1988, assigned to the present assignee and is incorporated here in by reference. Such a control arrangement can be easily adapted for positioning conveyor chute 42 as illustrated in FIG. 4.

Figure 4:
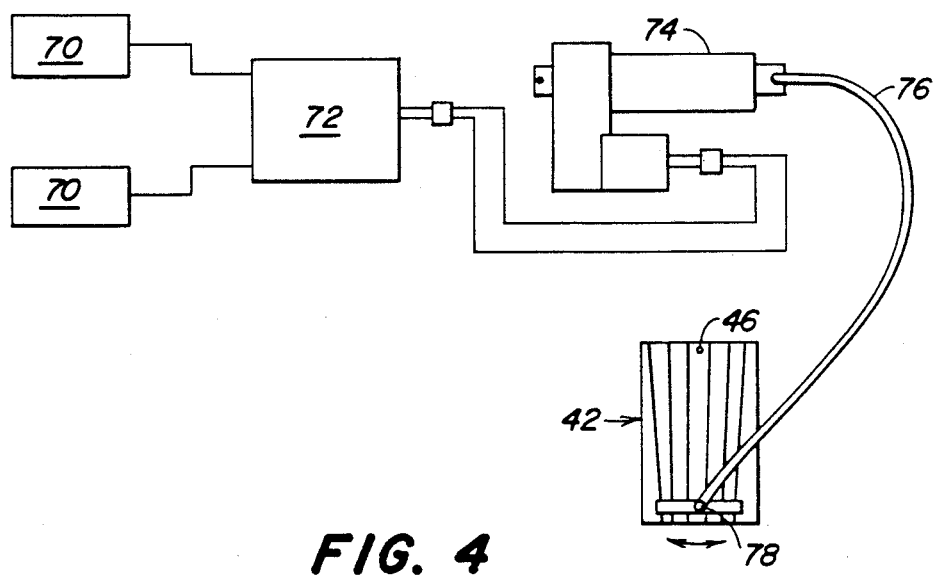
FIG. 4 is a schematic of the control arrangement.

In FIG. 4, sensors 70 direct an input signal to microcomputer 72. Sensors 70 can be inclination or grain loss sensors. In response to the sensor input signals, microcomputer 72 directs an output signal to motor 74. Motor 74 can be a linear output electric motor or an electro-hydraulic device. In response to the output signal from microcomputer 72, motor 74 manipulates push/pull cable 76. Push/pull cable 76 is operatively coupled to conveyor chute 42 at ball joint 78. In this way, conveyor chute 42 can be automatically pivoted about bearing 46 in response to input signals from sensors 70.

The operation of the conveyor arrangement 32 of this invention is as follows:

As soon as the harvesting machine 10 is moved over a field for a harvesting operation, the feeder assembly 25 delivers a flow of crop to the conveyor chute 42 of the conveyor arrangement 32. If the harvesting machine 10 is operating on an incline, the control arrangement will detect this by means of an inclination sensor or by crop losses at the end of the output unit 34 and develop an output signal for the motor or motors. If one assumes that the crop flow is greater on the left side of the conveyor arrangement 32 as seen in FIG. 2 due to the inclined operation, then the conveyor chute 42 will be rotated in counterclockwise direction, that is, the output end moves to the right and hence in the upslope direction. Accordingly, the transfer to the output unit 34 is offset in the upslope direction, so that the flow of the crop is evenly distributed on its path across the output unit 34. A loss of crop is, thus, eliminated.

When the harvesting machine 10 is once again operating on the horizontal terrain, the conveyor chute 42 again assumes a center position.

As discussed previously, a movement to adjust the conveyor chute 42 may also occur when crop losses are detected due to uneven distribution of the flow of the crop across the output unit 34, for example, when the entire width of the cutter is not used, when the slope conveyor does not feed uniformly, or if the gap between the thresher cylinder 24 and the concave 26 is not uniform.

Obviously, the application of such a conveyor arrangement 32 is not limited to a combine or a mobile harvesting machine, but it is also conceivable that it could be used with machines harvesting potatoes, peas or carrots. In the case of stationary machines with constantly changing operating locations, a moveable conveyor chute 42 could be provided in place of an inclination adjustment. In addition, all sorting machines with several conveyors in tandem could be considered, such as garbage or mail sorting installations with varying input. Applications can be found in any case in which a machine transfers materials to another device by means of a conveyor and where a uniform distribution is important.

We claim:

1. Conveyor arrangement for a harvesting machine having a feeder assembly mounted to the harvesting machine for receiving a harvested crop, a conveyor chute defining a conveying plane operatively associated with the feeder assembly for receiving crop material therefrom, and an output unit, operatively associated with the conveyor chute for receiving crop material from the conveyor chute, the conveyor chute is equipped with guide vanes that characterized by the fact that the conveyor chute is provided with a bearing located in the conveying plane, perpendicular to the conveying plane.

2. Conveyor arrangement as defined by claim 1 wherein the bearing is located near the feeder assembly.

3. Conveyor arrangement as defined by claim 2 wherein the conveyor chute has a trapezoidal conveying area.

4. Conveyor arrangement as defined by claim 3, wherein the guide vanes extend in a converging pattern from the feeder assembly to the output unit.

5. Conveyor arrangement as defined by claim 4 further comprising a conveyor pan and the bearing of the conveyor chute being attached to the conveyor pan.

6. Conveyor arrangement as defined by claim 4 further comprising a conveyor frame and the bearing of the conveyor chute is attached to the conveyor frame.

7. Conveyor arrangement as defined by claim 5 further comprising an automatic control arrangement for pivoting the conveyor chute.

8. Conveyor arrangement as defined by claim 7 wherein the control arrangement contains a sensor to sense the sideways inclination of the conveyor chute.

9. Conveyor arrangement as defined by claim 7 wherein the control arrangement contains a sensor to sense losses in crop flow.

10. Conveyor arrangement as defined by claim 7 wherein the control arrangement contains at least one motor to pivot the conveyor chute.

11. Conveyor arrangement as defined by claim 7 wherein the control arrangement comprises a microcomputer.

12. Conveyor arrangement as defined by claim 4 further comprising a housing in which the conveyor chute is pivoted wherein a seal extends between the housing and the conveyor chute.

13. Conveyor arrangement as defined by claim 12 wherein the conveyor chute is provided with side walls to which the seal is secured.

14. Conveyor arrangement as defined by claim 12 wherein the seal is secured to the guide vanes of the conveyor chute.

* * * * *

UNITED STATES PATENT AND TRADEMARK OFFICE
CERTIFICATE OF CORRECTION

PATENT NO.  :  4,968,284

DATED       :  6 November 1990

INVENTOR(S) :  Josef W. Klimmer et al.

It is certified that error appears in the above-identified patent and that said Letters Patent is hereby corrected as shown below:

Column 6 line 20, after "that" insert -- guide the flow of a crop along the conveyor chute -- ; line 22, after "plane," insert -- the bearing defining a bearing axis that is substantially -- .

Signed and Sealed this

Thirty-first Day of March, 1992

Attest:

HARRY F. MANBECK, JR.

*Attesting Officer*      *Commissioner of Patents and Trademarks*